United States Patent
Dechu et al.

(10) Patent No.: US 9,853,690 B1
(45) Date of Patent: Dec. 26, 2017

(54) GENERATING HIGH RESOLUTION INFERENCES IN ELECTRICAL NETWORKS

(71) Applicant: International Business Machines Corporation, Armonk, NY (US)

(72) Inventors: Sampath Dechu, Bangalore (IN); Pratyush Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/180,258

(22) Filed: Jun. 13, 2016

(51) Int. Cl.
| | |
|---|---|
| *H04B 3/00* | (2006.01) |
| *H04B 3/54* | (2006.01) |
| *H04L 12/751* | (2013.01) |
| *H04L 12/721* | (2013.01) |
| *G06N 5/04* | (2006.01) |

(52) U.S. Cl.
CPC .............. *H04B 3/544* (2013.01); *G06N 5/045* (2013.01); *H04L 45/02* (2013.01); *H04L 45/44* (2013.01)

(58) Field of Classification Search
CPC ........ H02J 1/14; H02J 2003/007; H02J 13/00; H02J 13/0079; H02J 3/06; H04B 3/54; H04L 41/12; H04L 43/0876; Y04S 10/522; Y04S 40/168; Y04S 40/164; G01R 19/2513; G01R 31/086
See application file for complete search history.

(56) References Cited

U.S. PATENT DOCUMENTS

| | | | | |
|---|---|---|---|---|
| 5,734,586 | A | * | 3/1998 | Chiang ..................... H02J 3/16 307/31 |
| 8,285,500 | B2 | | 10/2012 | Kreiss et al. |
| 8,401,709 | B2 | | 3/2013 | Cherian et al. |
| 2002/0123849 | A1 | * | 9/2002 | Quaintance ............... H02J 3/24 702/60 |
| 2012/0022713 | A1 | * | 1/2012 | Deaver, Sr. ............ G05B 17/02 700/298 |

(Continued)

OTHER PUBLICATIONS

Lyon et al., "Applying IT to Solve Societal Grand Challenges: Residential Energy Monitoring Services as the First Pillar", SRII '11 Proceedings of the 2011 Annual SRII Global Conference, pp. 113-119.

*Primary Examiner* — Khanh C Tran

(74) *Attorney, Agent, or Firm* — Ryan, Mason & Lewis, LLP

(57) ABSTRACT

Methods, systems, and computer program products for generating high resolution inferences in electrical networks are provided herein. A computer-implemented method includes collecting multiple items of data from one or more data sources arising from a power distribution network, wherein the multiple items of data comprise (i) one or more levels of temporal resolution and (ii) one or more levels of spatial resolution; determining a network topology of the power distribution network based on identification of one or more connections between each of multiple components within the power distribution network; and generating a power flow estimate for one or more nodes within the power distribution network at a pre-determined level of spatio-temporal resolution, wherein said generating comprises applying a model to (i) the multiple items of collected data, (ii) the determined network topology, and (iii) one or more relations constraining the power flow estimate at the pre-determined level of spatio-temporal resolution.

17 Claims, 4 Drawing Sheets

(56) References Cited

U.S. PATENT DOCUMENTS

| | | | |
|---|---|---|---|
| 2014/0244189 A1* | 8/2014 | Chiang | G01R 19/2513 |
| | | | 702/61 |
| 2015/0142526 A1 | 5/2015 | Forbes, Jr. | |
| 2016/0071013 A1 | 3/2016 | Benosman et al. | |
| 2016/0072270 A1* | 3/2016 | Rostron | H02H 3/081 |
| | | | 700/294 |

* cited by examiner

GENERATING HIGH RESOLUTION INFERENCES IN ELECTRICAL NETWORKS

FIELD

The present application generally relates to information technology, and, more particularly, to electrical network technology.

BACKGROUND

Power, among other utilities, is commonly distributed over very large networks. Planning and maintaining such networks often incur significant capital expenditures and/or operating expenses. Accordingly, acquiring relevant data is important for gaining visibility into the performance of such networks. However, gaining visibility in distribution networks via the implementation of new hardware can be cost-prohibitive.

SUMMARY

In one embodiment of the present invention, techniques for generating high resolution inferences in electrical networks are provided. An exemplary computer-implemented method can include steps of collecting multiple items of data from one or more data sources arising from a power distribution network, wherein the multiple items of data comprise (i) one or more levels of temporal resolution and (ii) one or more levels of spatial resolution; determining a network topology of the power distribution network based on identification of one or more connections between each of multiple components within the power distribution network; and generating a power flow estimate for one or more nodes within the power distribution network at a pre-determined level of spatio-temporal resolution, wherein said generating comprises applying a model to (i) the multiple items of collected data, (ii) the determined network topology, and (iii) one or more relations constraining the power flow estimate at the pre-determined level of spatio-temporal resolution.

In another embodiment of the invention, an exemplary computer-implemented method can include obtaining multiple items of data from a power distribution network, wherein the multiple items of data comprise (i) one or more temporal resolutions and (ii) one or more spatial resolutions, and identifying a network topology of the power distribution network based on identification of one or more connections between each of multiple components within the power distribution network. Such a method can also include determining (i) one or more nodes within the power distribution network for which power flow is to be estimated and (ii) a spatio-temporal resolution at which the power flow is to be estimated based on one or more items of enterprise-related information, and estimating the power flow for the one or more nodes at the spatio-temporal resolution, wherein said generating comprises modelling one or more relations constraining the power flow estimate at the pre-determined spatio-temporal resolution to the multiple items of collected data based on the determined network topology. Further, such a method can include identifying a class of one or more models which characterize the power flow at the spatio-temporal resolution, and communicating (i) the power flow estimate for the one or more nodes at spatio-temporal resolution and (ii) the identified class of one or more models, to one or more decision support systems related to the power distribution network.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
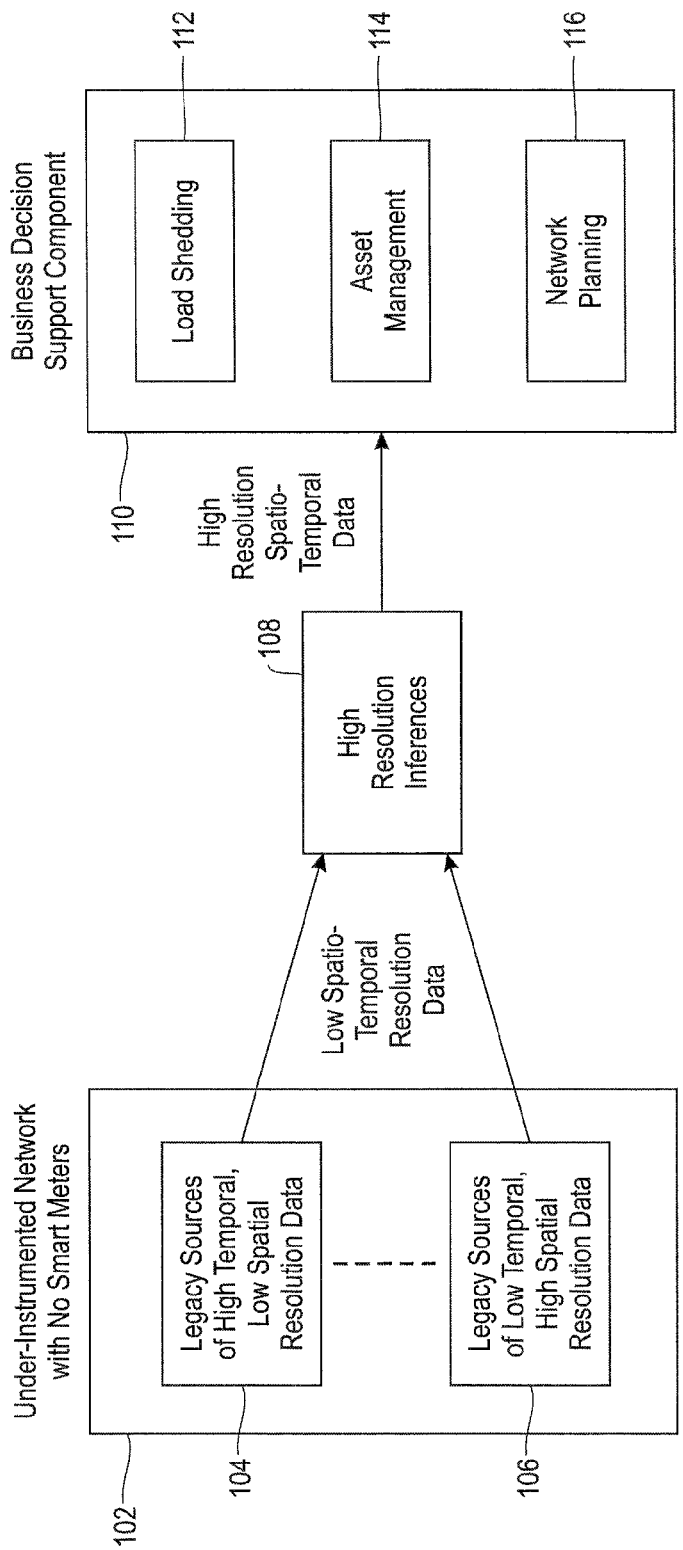
FIG. 1 is a diagram illustrating system architecture, according to an exemplary embodiment of the invention.

As described herein, an embodiment of the present invention includes generating high resolution spatio-temporal data in legacy electrical networks which do not have advanced meter infrastructure (such as for example, smart meters present in homes). As also detailed herein, for resource-constrained legacy networks, the available data sources commonly include low resolution data (such as, for example, generator logs, consumer bills, and/or supervisory control and data acquisition (SCADA) logs at particular nodes within the network).

Accordingly, at least one embodiment of the invention includes generating higher resolution inferences in under-instrumented legacy energy and/or electrical networks for estimating higher resolution power flow for standardizing business decision support systems such as distribution automation system, asset management system etc. One or more embodiments of the invention include collecting data from legacy data sources at different temporal and spatial resolutions, as well as from distribution network topology (connections between sub-stations and distribution transformers, etc.). Collected data can include, for example, monthly user bills, hourly logs from sub-station SCADA devices, hourly generator logs, etc.

Additionally, at least one embodiment of the invention includes identifying one or more network nodes at which power flow is to be estimated, as well as identifying the required resolution (for example, the daily aggregate energy at a transformer), based on an information value for business decisions (for example, load shedding, network planning, etc.). As used herein, "information value" of such data can be referred to as the reduction in entropy or uncertainty in the decision given the additional data. In one or more embodiments of the invention, such nodes can include the network nodes, wherein fusing low-temporal-high-spatial data (such as bill data, for example) and high-temporal-low-spatial data (such as generators logs, for example) adds statistical value in estimating power flow. Such nodes can be identified (and referred to herein) as "intermediate nodes" in the power grid.

Further, at least one embodiment of the invention can also include modelling relations constraining the unknown higher resolution power flow to the available data sources based on network topology. As used herein, such "relations" can include power flow equations that require that the incoming and outgoing power at all nodes be equal. Additionally, in one or more embodiments of the invention, the higher resolution power flow is almost equivalent to the estimated power flow, but the former is used before solving the problem, and the latter is used to refer to the computed solution (which is an approximation of the higher resolution power flow). Also, at least one embodiment of the invention can additionally include identifying a class of models which characterizes the unknown higher resolution power flow (such as, for example, auto-regressive (AR) models).

FIG. 1 is a diagram illustrating system architecture, according to an embodiment of the invention. By way of illustration, FIG. 1 depicts an under-instrumented network 102 that has no smart meters, and which includes legacy sources 104 of high temporal, low spatial resolution data, as well as legacy sources 106 of low temporal, high spatial resolution data. Low spatial resolution data can include, for example, generator logs, and high spatial resolution data can include, for example, monthly bills. Legacy sources 104 and 106 provide low spatio-temporal resolution data to a high resolution inferences computation component 108, which generates and outputs high resolution spatio-temporal data to a business decision support component 110.

As depicted in FIG. 1, the business decision support component 110 can include one or more of several use-cases such as (i) a load shedding component 112 to plan when, where and for how long to cut the power supply to match demand and supply, (ii) an asset management component 114 to determine the health of the different equipment, and (iii) a network planning component 116 to determine expansion of the power distribution network.

Figure 2:
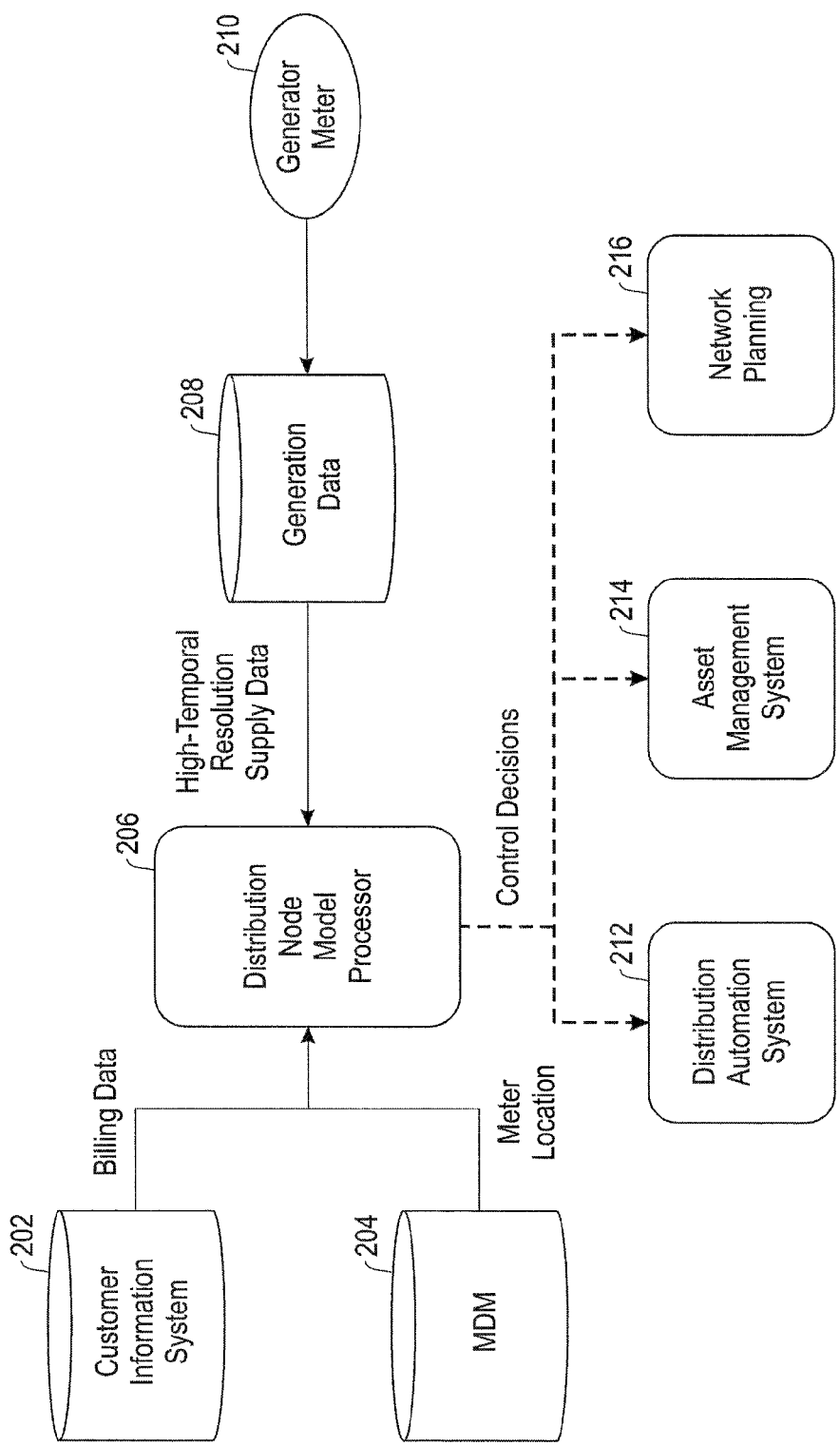
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a customer information system database 202, which provides billing data to a distribution node model processor 206. Additionally, FIG. 2 depicts a mobile device management (MDM) database 204, which provides meter location to the distribution node model processor 206. Also, a generator meter 210 provides input of power flow of the generated power at a high temporal resolution and a low spatial resolution to a generation data database 208, which thereby catalogues and forwards the input to the distribution node model processor 206.

The distribution node model processor 206, based on processing of the provided inputs, generates and outputs control decisions to various systems and/or components such as a distribution automation system 212, which can plan load shedding, an asset management system 214, which can detect ageing in the network hardware, and a network planning component 216, which can plan network expansion.

As detailed herein, at least one embodiment of the invention includes identifying a class of models that characterizes time-series data at one or more distribution nodes within a network. Further, such an embodiment can include determining the model within an identified class that most closely matches and/or best explains billing and generator data (such as detailed in connection with FIG. 2). One or more embodiments of the invention can include separately determining (i) the model that most closely matches and/or best explains the time-series data with respect to billing constraints, and (ii) the model that most closely matches and/or best explains the time-series data with respect to generator constraints. In such an embodiment, the decoupling into these two models separately enables computational tractability by mapping the optimization of the two models onto search methods.

Additionally, at least one embodiment of the invention can include implementing a confidence bound, which is a function of the diameter of the space of all solutions satisfying billing, generator, and model constraints. By way of example, higher billing data resolution and smaller network size can result in the identification of a more accurate class of models, and thus a smaller diameter of space which then corresponds to a tighter confidence bound.

Also, one or more embodiments of the invention include implementing an optimization technique, wherein $x_i(t)$ denotes an unknown power flow through the node i, G denotes a set of constraints on $x(t)$, such that the available generation data are satisfied, and B denotes a set of constraints on $x(t)$, such that the available consumer billing data are satisfied. Accordingly, at least one embodiment of the invention can include determining $x_i(t)$ given G and B. Such a scenario includes an under-determined system of equations because generator data can have higher temporal resolution than x, but low spatial resolution, and consumer bill data can have higher spatial resolution than x, but low temporal resolution.

Alternatively, at least one embodiment of the invention can include determining $x_i(t)$ given G and B, and wherein $x_i(t)$ belongs to M, a class of models which restrict the space of solutions. The class of models, M, characterizes the typical time-series patterns of the power flow in the distribution nodes. Solving the optimization problem in this example embodiment is not easy because the typical class of models, M, is complex such that optimization constrained by G and B is very hard. For example, M can be the class of time-series satisfying AR-26 (autoregressive time-series with up to 26 parameters). Accordingly, in attempting to solve such an optimization problem, one or more embodiments of the invention can include an iterative approach that includes (i) estimating a specific model m in the class M, (ii) estimating $x_i(t)$ to simultaneously satisfy G, B, and constraints of m, (iii) estimating a new model m within the class M which better models the current estimate $x_i(t)$, and (iv) iterating steps (i), (ii), and (iii) until the estimate $x_i(t)$ converges.

Additionally, an example embodiment of the invention implementing the above-noted iterative approach can include using a modified expectation-maximization (EM) algorithm, wherein: (i) the E-step is additionally constrained by variables other than the estimated parameters (G and B), and (ii) the M-step is standard.

Figure 3:
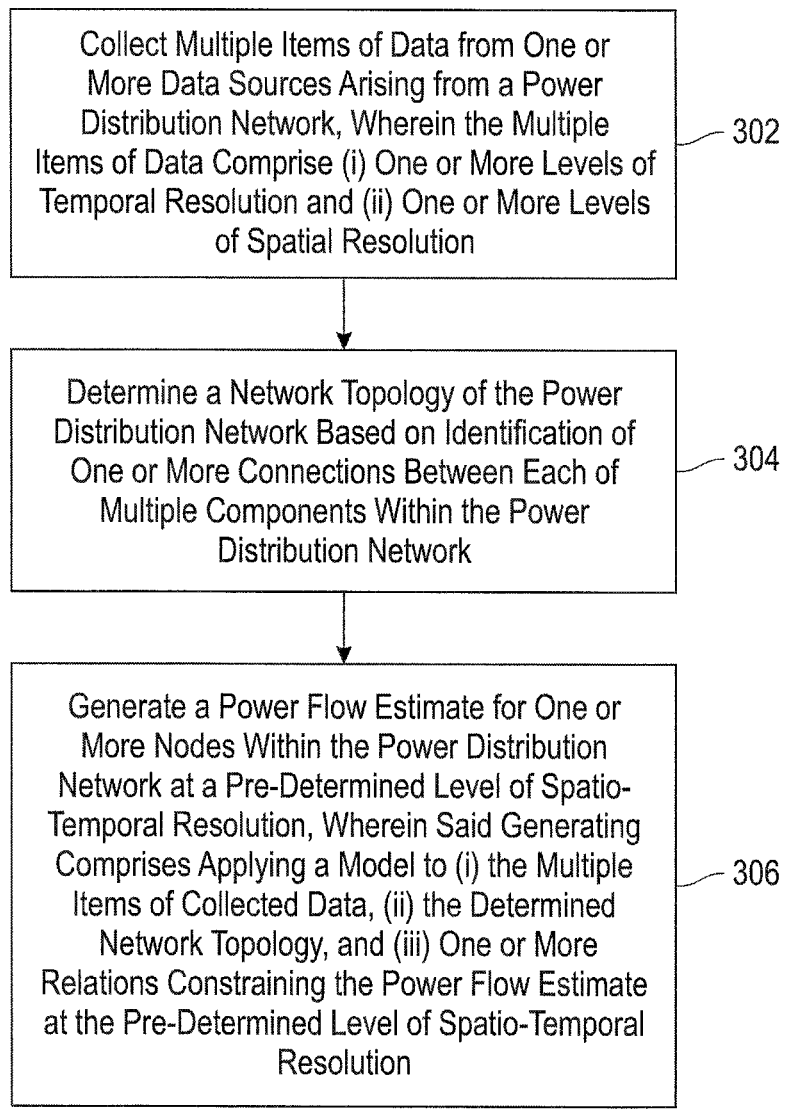
FIG. 3 is a flow diagram illustrating techniques, according to an embodiment of the invention.

FIG. 3 is a flow diagram illustrating techniques, according to an embodiment of the present invention. Step 302 includes collecting multiple items of data from one or more data sources arising from a power distribution network, wherein the multiple items of data comprise (i) one or more levels of temporal resolution and (ii) one or more levels of spatial resolution. The data sources can include, for example, one or more legacy data sources. Also, the items of data can include one or more user bills, one or more logs from a monitoring device, and/or one or more generator logs.

Step 304 includes determining a network topology of the power distribution network based on identification of one or more connections between each of multiple components within the power distribution network. The components within the power distribution network can include one or more sub-stations and one or more distribution transformers.

Step 306 includes generating a power flow estimate for one or more nodes within the power distribution network at a pre-determined level of spatio-temporal resolution, wherein said generating comprises applying a model to (i) the multiple items of collected data, (ii) the determined network topology, and (iii) one or more relations constraining the power flow estimate at the pre-determined level of spatio-temporal resolution. In one or more embodiments of the invention, the pre-determined level of spatio-temporal resolution is of a higher resolution than each of (i) the one or more levels of temporal resolution of the collected data and (ii) the one or more levels of spatial resolution of the collected data.

The techniques depicted in FIG. 3 can also include identifying (i) the one or more nodes within the power distribution network for which the power flow is to be estimated and (ii) the pre-determined level of spatio-temporal resolution based on one or more items of enterprise-related information. Additionally, the techniques depicted in FIG. 3 can include identifying a class of one or more models which characterize the power flow at the pre-determined level of spatio-temporal resolution, wherein the class of one or more models can include one or more auto-regressive models. One or more embodiments of the invention can also include performing an optimization by iteratively (i) generating a power flow estimate for one or more nodes within the power distribution network at a pre-determined level of spatio-temporal resolution and (ii) identifying a class of one or more models which characterize the power flow at the pre-determined level of spatio-temporal resolution.

Further, the techniques depicted in FIG. 3 can include outputting the power flow estimate for the one or more nodes at the pre-determined level of spatio-temporal resolution to one or more decision support systems related to the power distribution network, wherein the one or more decision support systems can include a distribution automation system and/or an asset management system.

Also, an additional embodiment of the invention includes obtaining multiple items of data from a power distribution network, wherein the multiple items of data comprise (i) one or more temporal resolutions and (ii) one or more spatial resolutions, and identifying a network topology of the power distribution network based on identification of one or more connections between each of multiple components within the power distribution network. Such an embodiment can also include determining (i) one or more nodes within the power distribution network for which power flow is to be estimated and (ii) a spatio-temporal resolution at which the power flow is to be estimated based on one or more items of enterprise-related information, and estimating the power flow for the one or more nodes at the spatio-temporal resolution, wherein said generating comprises modelling one or more relations constraining the power flow estimate at the pre-determined spatio-temporal resolution to the multiple items of collected data based on the determined network topology. Further, such an embodiment can include identifying a class of one or more models which characterize the power flow at the spatio-temporal resolution, and communicating (i) the power flow estimate for the one or more nodes at spatio-temporal resolution and (ii) the identified class of one or more models, to one or more decision support systems related to the power distribution network.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
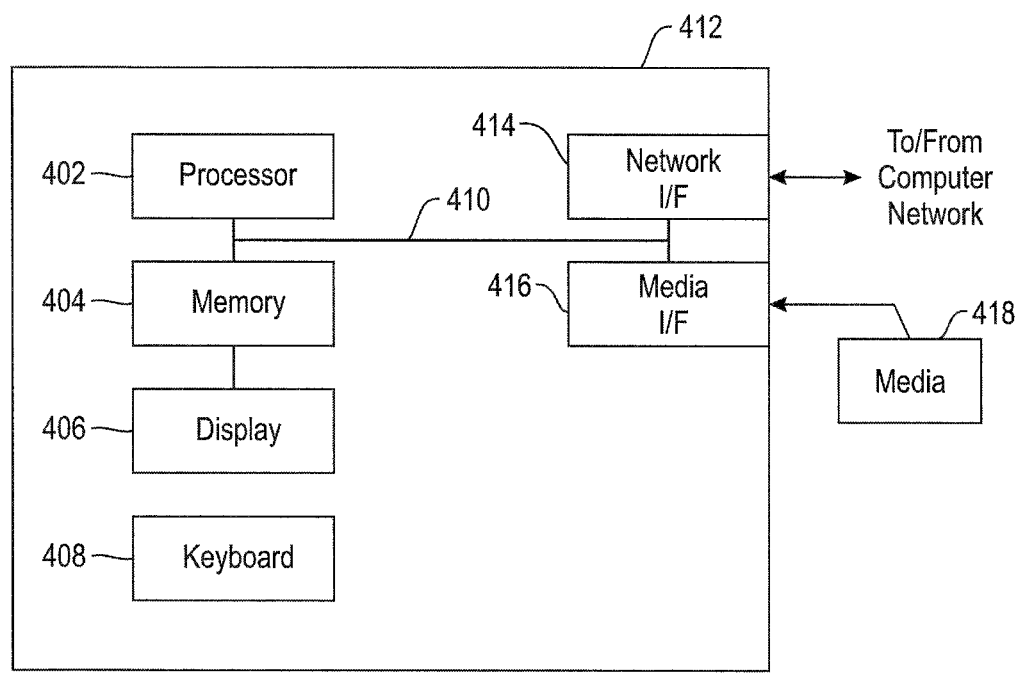
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any other type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, utilizing legacy data at different temporal and spatial resolutions to estimate high resolution power flow at a node in legacy electrical networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   collecting multiple items of data from one or more data sources arising from a power distribution network, wherein the multiple items of data comprise (i) one or more levels of temporal resolution and (ii) one or more levels of spatial resolution;
   determining a network topology of the power distribution network based on identification of one or more connections between each of multiple components within the power distribution network; and
   performing an optimization by iteratively:
   (a) generating a power flow estimate for one or more nodes within the power distribution network at a pre-determined level of spatio-temporal resolution, wherein said generating comprises applying a model to (i) the multiple items of collected data, (ii) the determined network topology, and (iii) one or more relations constraining the power flow estimate at the pre-determined level of spatio-temporal resolution; and
   (b) identifying a class of one or more models which characterize the power flow at the pre-determined level of spatio-temporal resolution;
   wherein the steps are carried out by at least one computing device.

2. The computer-implemented method of claim 1, wherein the one or more data sources comprise one or more legacy data sources.

3. The computer-implemented method of claim 1, wherein the multiple items of data comprise one or more user bills.

4. The computer-implemented method of claim 1, wherein the multiple items of data comprise one or more logs from a monitoring device.

5. The computer-implemented method of claim 1, wherein the multiple items of data comprise one or more generator logs.

6. The computer-implemented method of claim 1, wherein the multiple components within the power distribution network comprise (i) one or more sub-stations and (ii) one or more distribution transformers.

7. The computer-implemented method of claim 1, wherein the pre-determined level of spatio-temporal resolution is of a higher resolution than each of (i) the one or more levels of temporal resolution of the collected data and (ii) the one or more levels of spatial resolution of the collected data.

8. The computer-implemented method of claim 1, comprising:
   identifying (i) the one or more nodes within the power distribution network for which the power flow is to be estimated and (ii) the pre-determined level of spatio-temporal resolution based on one or more items of enterprise-related information.

9. The computer-implemented method of claim 1, wherein the class of one or more models comprises one or more auto-regressive models.

10. The computer-implemented method of claim 1, comprising:
    outputting the power flow estimate for the one or more nodes at the pre-determined level of spatio-temporal resolution to one or more decision support systems related to the power distribution network.

11. The computer-implemented method of claim 10, wherein the one or more decision support systems comprises a distribution automation system.

12. The computer-implemented method of claim 10, wherein the one or more decision support systems comprises an asset management system.

13. A computer program product comprising a non-transitory computer readable storage medium having program instructions embodied therewith, the program instructions executable by a device to cause the device to:
    collect multiple items of data from one or more data sources arising from a power distribution network, wherein the multiple items of data comprise (i) one or more levels of temporal resolution and (ii) one or more levels of spatial resolution;
    determine a network topology of the power distribution network based on identification of one or more connections between each of multiple components within the power distribution network; and perform an optimization by iteratively:
(a) generating a power flow estimate for one or more nodes within the power distribution network at a pre-determined level of spatio-temporal resolution, wherein said generating comprises applying a model to (i) the multiple items of collected data, (ii) the determined network topology, and (iii) one or more relations constraining the power flow estimate at the pre-determined level of spatio-temporal resolution; and
(b) identifying a class of one or more models which characterize the power flow at the pre-determined level of spatio-temporal resolution.

14. The computer program product or claim 13, wherein the multiple items of data comprise one or more user bills, one or more logs from a monitoring device, and/or one or more generator logs.

15. The computer program product or claim 13, wherein the program instructions embodied therewith further cause the device to:
output the power flow estimate for the one or more nodes at the pre-determined level of spatio-temporal resolution to one or more decision support systems related to the power distribution network.

16. A system comprising:
a memory; and
at least one processor coupled to the memory and configured for:
collecting multiple items of data from one or more data sources arising from a power distribution network, wherein the multiple items of data comprise (i) one or more levels of temporal resolution and (ii) one or more levels of spatial resolution;
determining a network topology of the power distribution network based on identification of one or more connections between each of multiple components within the power distribution network; and
performing an optimization by iteratively:
(a) generating a power flow estimate for one or more nodes within the power distribution network at a pre-determined level of spatio-temporal resolution, wherein said generating comprises applying a model to (i) the multiple items of collected data, (ii) the determined network topology, and (iii) one or more relations constraining the power flow estimate at the pre-determined level of spatio-temporal resolution; and
(b) identifying a class of one or more models which characterize the power flow at the pre-determined level of spatio-temporal resolution.

17. A computer-implemented method, comprising:
obtaining multiple items of data from a power distribution network, wherein the multiple items of data comprise (i) one or more temporal resolutions and (ii) one or more spatial resolutions;
identifying a network topology of the power distribution network based on identification of one or more connections between each of multiple components within the power distribution network;
determining (i) one or more nodes within the power distribution network for which power flow is to be estimated and (ii) a spatio-temporal resolution at which the power flow is to be estimated based on one or more items of enterprise-related information;
performing an optimization by iteratively:
(a) estimating the power flow for the one or more nodes at the spatio-temporal resolution, wherein said generating comprises modelling one or more relations constraining the power flow estimate at the pre-determined spatio-temporal resolution to the multiple items of collected data based on the determined network topology; and
(b) identifying a class of one or more models which characterize the power flow at the spatio-temporal resolution; and
communicating (i) the power flow estimate for the one or more nodes at spatio-temporal resolution and (ii) the identified class of one or more models, to one or more decision support systems related to the power distribution network;
wherein the steps are carried out by at least one computing device.

* * * * *